March 12, 1940.  I. C. MATTHEWS ET AL  2,193,035

SYNTHETIC RESIN LIGHT FILTER

Filed Sept. 23, 1938

WATER-SOLUBLE SYNTHETIC RESIN CONTAINING A DYE

WATER-SOLUBLE SYNTHETIC RESIN CONTAINING A DYE

Irving C. Matthews
Glenn M. Atkins
Inventors

By Newton M. Perrins
R. Frank Smith
Attorneys

Patented Mar. 12, 1940

2,193,035

UNITED STATES PATENT OFFICE 2,193,035

SYNTHETIC RESIN LIGHT FILTER

Irving C. Matthews and Glenn M. Atkins, Rochester, N. Y., assignors to Eastman Kodak Company, Rochester, N. Y., a corporation of New Jersey Application September 23, 1938, Serial No. 231,366

6 Claims. (Cl. 88—114)

This invention relates to light filters and particularly to light filters designed for photographic use such as in cameras, projectors and safe lights.

The majority of light filters used in photography depend upon the use of gelatin as the filter medium, a dye being dissolved or dispersed in the gelatin to secure the light filtering action. A great many objections exist to the use of gelatin in this way. Gelatin is a product of animal origin and its uniformity at times is questionable. Furthermore, it is hygroscopic in nature and, therefore, presents difficulties both in coating as filters and in commercial use of the filters. This difficulty is quite acute when the filters are to be used under tropical conditions. Furthermore, gelatin filters must be handled with extreme care and their susceptibility to supporting or marking when touched by the hand is well known.

It has been proposed to displace the gelatin used in photographic filters with various synthetic resins. These compounds, however, are usually insoluble in water and the water soluble filter dyes which are ordinarily used in gelatin cannot be incorporated in solutions of the resins. It is frequently impossible to find dyes which possess the light absorption characteristics and which are soluble in the solvents used to dissolve the synthetic resins or in the synthetic resins themselves. A further objection to the use of the water insoluble synthetic resins is that the solvents used to dissolve them must be recovered after coating.

These objections are overcome by the present invention by dissolving the filter dyes in water soluble synthetic resins and coating them on a support to which they may be permanently attached or from which they may be removed for use.

Figure 1:
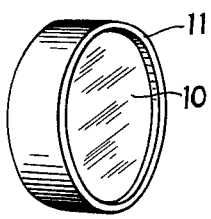
Figure 2:
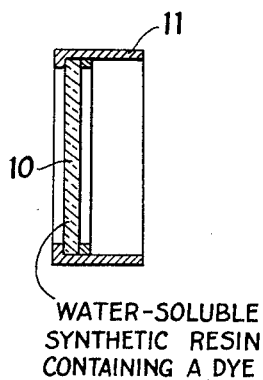
Figure 3:
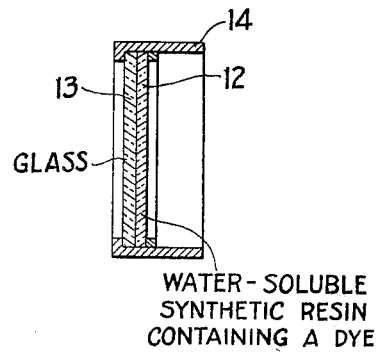

In the accompanying drawing, Fig. 1 is a perspective view of a light filter adapted to photograph over a camera lens, Fig. 2 is a sectional view of this filter and Fig. 3 is a sectional view of a similar type of filter in which the filtering material is permanently coated on a glass support.

The light filters are produced according to our invention by using a suitable water soluble synthetic resin as a carrying medium of the filter. These compounds include the polyvinyl acetaldehyde acetal resins or partially hydrolyzed polyvinyl acetate resins which are soluble in water. The structural formula of the polyvinyl acetaldehyde acetal resins may be represented as follows:

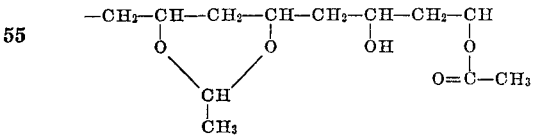

and the structural formula of the partially hydrolyzed polyvinyl acetate resins may be represented as follows:

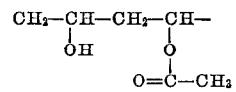

As may be seen from these formulae, the acetal resins contain the acetaldehyde acetal group as well as the hydroxyl and acetate groups and the partially hydrolyzed polyvinyl acetate resins contain only hydroxyl and acetate groups attached to the resin chain. These formulae are merely illustrative of the particular resins used and do not necessarily represent the sequence or molecular ratio in which these groups occur in the resin.

It will be understood that these resins may be made with various proportions of hydroxyl acetate and acetal groups in the molecule. Methods of making these resins have been described in prior patents such as Voss U. S. Patent No. 1,939,422 and Morrison et al. U. S. Patent No. 2,036,092. These resins are made from polyvinyl acetate by de-esterifying and treating with acetaldehyde to introduce the acetal groups. By varying such conditions as the viscosity of the vinyl ester polymer, the extent of hydrolysis, the amount of aldehyde reacted with the hydrolyzed ester polymer, and the character and amount of catalyst used, the proportion of the various groups substituted in the resin chain may be controlled. The resins which we have found suitable for use as filtering media and which we propose to use according to our invention are the polyvinyl acetaldehyde acetal resins having a polyvinyl acetaldehyde acetal content of at least 50% and an uncombined hydroxyl content corresponding to at least 15% polyvinyl alcohol. The acetate content of these resins may be calculated by taking the difference between 100% and the sum of the amount of polyvinyl acetaldehyde acetal and uncombined hydroxyl, since in the case of the polyvinyl acetaldehyde acetal resins the sum of the three constituents is always 100%. In the case of the partially hydrolyzed polyvinyl acetate resins, we propose to use compounds containing from about 20% to about 50% polyvinyl acetate. The hydroxyl content calculated as polyvinyl alcohol is in every case the difference between 100% and the polyvinyl acetate content. The use of these resins for overcoating photographic film is described in Murray and Kenyon U. S. application Serial No. 221,579, filed July 27, 1938.

The water soluble synthetic resins which we propose to use may have incorporated in them any suitable water soluble filter dye such as Rose Bengal (Schultz-Farbstofftabellen No. 595), Naphthol Green (Schultz-Farbstofftabellen No. 4), Methyl violet (Schultz-Farbstofftabellen No.

515) or rapid filter yellow. "Rapid filter yellow" is a general term for any one or a mixture of certain water-soluble dyes, such as Naphthol Yellow S, Quinoline Yellow, Aurantia, or Tartrazine. Besides dyes, other coloring agents, such as pigments and lakes, or any chemical or mechanical mixture of these with dyes may also be used.

The synthetic resin solution as made up for coating may also contain a spreading agent such as saponin and a defoaming compound such as propyl, heptyl, octyl, capryl or other alcohol to prevent foaming of the solution on coating.

The various ingredients used in the solution from which the filtering material is coated may vary within the wide limits but the approximate proportions should be as follows:

|  | Per cent |
|---|---|
| Synthetic resin | 20 to 80 |
| Spreading agent | 0 to 10 |
| Defoaming agent | 0 to 3 |
| Dye | 3 to 20 |

The synthetic resins which we propose to use are soluble in water at various temperatures depending upon the composition of the resin. In general the polyvinyl acetaldehyde acetal resins are soluble only in water at a temperature below about 15° C. The partially hydrolyzed polyvinyl acetate resins are soluble in water at higher temperatures. Water soluble polyvinyl acetaldehyde acetal resins having a polyvinyl acetal content of less than 50% and a hydroxyl content corresponding to an amount of polyvinyl alcohol between about 30% and 60% are soluble in water at higher temperatures and may be soluble in water at temperatures as high as 40° C.

Other resins which may be used according to our invention include polyvinyl alcohol, methyl methacrylate, and others.

According to the preferred embodiments of our invention, which are illustrative only, solutions of water soluble synthetic resins are made up and coated at temperatures between about 0° and 15° C. These solutions are illustrated by the following examples:

*Example 1*

The following solution was made up:

| Polyvinyl acetaldehyde acetal resin having a polyvinyl acetate content of 1.6%, a hydroxyl content corresponding to 22.1% polyvinyl alcohol and a polyvinyl acetal content of 76.3% | grams | 45 |
|---|---|---|
| Saponin | gram | 0.1 |
| Octyl alcohol | cc | 0.01 |
| Rose Bengal | gram | 1 |
| Water | grams | 405 |

This solution was coated on a glass support at a temperature of 0–3° C. and was allowed to dry in the air. We found that the coating could then be removed from the glass or could be allowed to remain on the glass as a filtering material.

*Example 2*

The following solution was made up:

| Partially hydrolyzed polyvinyl acetate having a polyvinyl acetate content of 40% and a hydroxyl content corresponding to 60% polyvinyl alcohol | grams | 36 |
|---|---|---|
| Saponin | gram | 0.5 |
| Propyl alcohol | cc | 0.3 |
| Methyl Violet | gram | 1 |
| Water | grams | 414 |

This solution was coated on a glass support at 15° C. and was permitted to dry in the air. It was found that it could be stripped from the glass for use as a filter or could be left in contact with glass as in the case of Example 1.

The light filters may, according to our invention, remain on a suitable support such as glass or they may be stripped from the support after coating for use as a separate filter element. In the accompanying drawing, we have shown filters made according to our invention. As shown therein, Fig. 1 is a perspective view of a light filter adapted for use over the lens of a camera comprising a filtering sheet 10 of a water soluble synthetic resin containing a filtering dye set in a frame 11 adapted to fit over the lens mount of a camera. Fig. 2 is a sectional view of the same filter. In Fig. 3 the filtering medium is illustrated as a filtering layer 12 of a water soluble synthetic resin containing a filtering dye the cellulose layer being permanently attached to a support 13 of glass or other suitable transparent material such as a cellulose ester, the composite structure being set into the frame 14.

Although we have described our invention with reference to its use in filters for photographic camera, it is to be understood that our filters may be used for other purposes such as for motion picture or still projectors, photographic wedges and safe lights and in other ways in which they may be desirable to afford the proper optical characteristics.

It is to be understood that the various compounds, proportions and conditions referred to herein are by way of example only and in that our invention is capable of numerous other modifications not herein specifically mentioned. Our invention is to be taken as limited only by the scope of the appended claims.

We claim:

1. A light filter comprising a synthetic resin selected from the group consisting of polyvinyl acetaldehyde acetals having a polyvinyl acetal content of at least 50% and an uncombined hydroxyl content corresponding to at least 15% polyvinyl alcohol, polyvinyl acetaldehyde acetals, having a polyvinyl acetal content of less than 50% and an uncombined hydroxyl content corresponding to 30% to 60% polyvinyl alcohol and partially hydrolized polyvinyl acetates of from about 20% to about 50% polyvinyl acetate content, the resin having a water-soluble filter dye uniformly dispersed therein.

2. A light filter comprising a polyvinyl acetaldehyde acetal resin having a polyvinyl acetal content of at least 50% and an uncombined hydroxyl content corresponding to at least 15% polyvinyl alcohol and having a water soluble filter dye uniformly dispersed therein.

3. A light filter comprising a polyvinyl acetaldehyde acetal resin having a polyvinyl acetal content of approximately 76% and an uncombined hydroxyl content corresponding to approximately 22% polyvinyl alcohol, and having a water soluble filter dye uniformly dispersed therein.

4. A composition of matter adapted for coating to produce a light filter comprising 20% to 80% of a synthetic resin selected from the group consisting of a polyvinyl acetaldehyde acetal having a polyvinyl acetal content of at least 50% and an uncombined hydroxyl content corresponding to at least 15% polyvinyl alcohol and partially hydrolyzed polyvinyl acetates of from about 20% to about 50% polyvinyl acetate content, and 3% to 20% of a water soluble filter dye.

5. A composition of matter adapted for coating to produce a light filter comprising 20% to 80% of a polyvinyl acetaldehyde acetal resin having a polyvinyl acetal content of at least 50% and an uncombined hydroxyl content corresponding to at least 15% polyvinyl alcohol, and 3% to 20% of a water soluble filter dye.

6. The method of making a photographic light filter which comprises mixing a water soluble filter dye with a water soluble synthetic resin selected from the group consisting of polyvinyl acetaldehyde acetals having a polyvinyl acetal content of at least 50% and an uncombined hydroxyl content corresponding to at least 15% polyvinyl alcohol and partially hydrolyzed polyvinyl acetates of from about 20% to about 50% polyvinyl acetate content and coating the solution on a rigid support at a temperature of from 0° to 15° C.

IRVING C. MATTHEWS.
GLENN M. ATKINS.